United States Patent [19]

Cahill et al.

[11] 4,375,680
[45] Mar. 1, 1983

[54] OPTICAL ACOUSTIC SENSOR

[75] Inventors: Richard F. Cahill, El Toro; Eric Udd, Huntington Beach, both of Calif.

[73] Assignee: McDonnell Douglas Corporation, Long Beach, Md.

[21] Appl. No.: 225,731

[22] Filed: Jan. 16, 1981

[51] Int. Cl.³ .................. G02B 5/11; G01V 1/00; H04B 9/00
[52] U.S. Cl. ............................ 367/149; 367/178; 73/655; 455/605; 455/612
[58] Field of Search .............. 455/605, 612; 367/3, 367/76, 141, 149, 172, 178; 73/655, 657

[56] References Cited

U.S. PATENT DOCUMENTS

| | | | |
|---|---|---|---|
| 3,611,277 | 10/1971 | Yoder | 367/174 |
| 4,115,753 | 9/1978 | Shajenko | 367/149 |
| 4,193,130 | 3/1980 | Young et al. | 367/149 |
| 4,238,856 | 12/1980 | Bucaro et al. | 455/605 |
| 4,265,122 | 5/1981 | Cook et al. | 73/627 |
| 4,297,887 | 11/1981 | Bucaro | 73/655 |
| 4,301,543 | 11/1981 | Palmer | 455/612 |
| 4,311,391 | 1/1982 | Gilmour | 73/655 |
| 4,313,185 | 1/1982 | Chavan | 73/657 |

OTHER PUBLICATIONS

Poppo et al., "Vibration Induced Polarization . . . ", 1/79, pp. 1-3.
Shajenko et al., "Signal . . . Light Source", 6/15/80, pp. 1895-1897, Applied Optics, vol. 19, #12.
Bucaro et al., "Acousto-Optic Sensor Development", 10/11/79, pp. 572-580, EASCON, 1979, IEEE E & A Syst.
Bucaro et al., "Single Fiber Interferomatic Acoustic Sensor", 2/1/78, pp. 330-331, Applied Optics, vol. 17, #3.

Primary Examiner—Nelson Moskowitz
Attorney, Agent, or Firm—George W. Finch; John P. Scholl; Donald L. Royer

[57] ABSTRACT

A light source is operated near its threshhold and its output is split and sent in opposite direction about a fiber optic coil which is exposed to acoustic energy. The recombined light out of the coil is modulated at acoustic frequency. The modulated light can be fed back to the light source which responds to the modulation with large amplitude variations which are sent to a detector for conversion into an electrical signal representative of the acoustic energy. Alternatively, the light beam may be directed from the fiber coil to the detector directly. The sensors can include components for rejecting noise at frequencies not of interest and a plurality of similar sensors can be formed in an array to obtain directional information or increased sensitivity.

31 Claims, 22 Drawing Figures

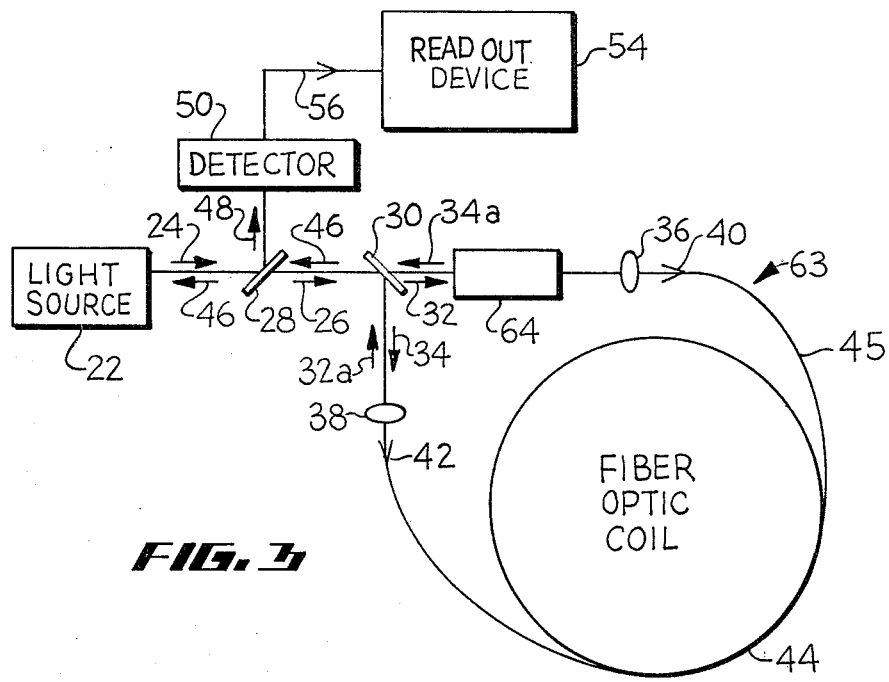
FIG. 3
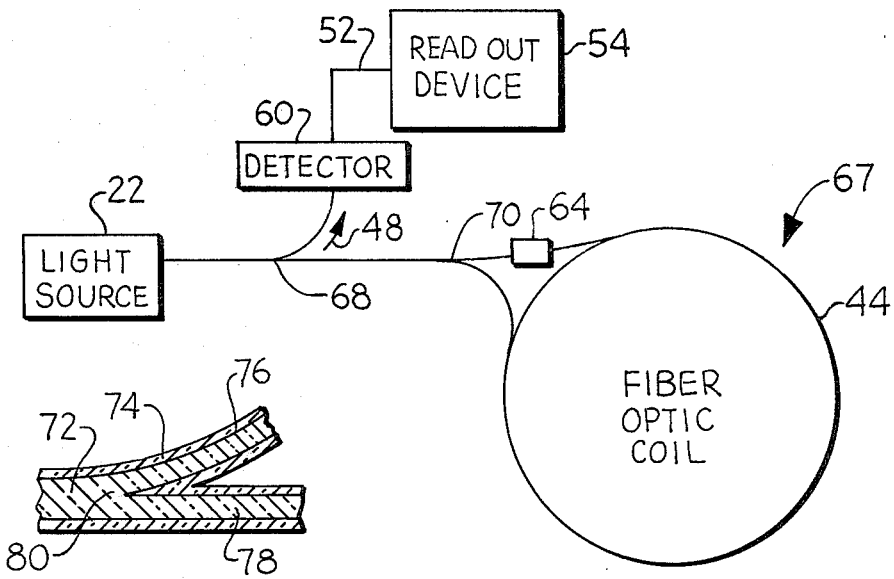
FIG. 4A
FIG. 4

OPTICAL ACOUSTIC SENSOR

CROSS REFERENCE TO RELATED PATENT APPLICATION

This case is related to U.S. Pat. No. 4,299,490, filed Dec. 7, 1978, entitled "Phase Nulling Optical Gyro" by Richard F. Cahill and Eric Udd. The teachings of that application are hereby incorporated by reference as though fully set forth hereinbelow.

BACKGROUND OF THE INVENTION

Extremely sensitive, low-cost acoustic sensors are required for a wide range of applications, many of which involve operation under hostile environmental conditions. Typical examples are under water acoustic sensors for detection of deep diving submarines and geophones used to record the response of the earth to acoustic impulses applied thereto in the search for minerals and petroleum. It has been recognized that fiber optics may allow the construction of rugged, high performance microphones and, in particular, the United States Navy has successfully developed an approach based on the comparison of light passed through a reference optical fiber shielded from acoustic noise with light passed through a second signal fiber. This approach is reported in the paper entitled, "Fiber-Optic Hydrophone" by J. A. Bucaro, et al.

Unfortunately, the available devices are orders of magnitude less sensitive than what is desired for some applications. Also, many sensitive acoustic devices have the need, heretofore, unfulfilled, for automatic noise suppression, low cost, and ease of incorporation in acoustic sensor arrays.

BRIEF DESCRIPTION OF THE PRESENT INVENTION

In its simplest form, the present invention includes a source of light whose output is split by a beamsplitter and conducted into the opposite ends of a fiber optic coil. Acoustic noise impinging on the fiber coil causes nonreciprocal phase differences between the beams propagating through the fiber optic coil in the counter-clockwise and clockwise directions. The nonreciprocal phase differences are superimposed when the beams are recombined in the beamsplitter. The recombined beam is directed back to the light source. Consequently, the light beam directed back to the light source is modulated at the acoustic frequency of the noise applied to the fiber coil. It is preferable that the light source be a laser diode operating near threshold so that the small amounts of feedback due to back-scattered light will result in large fluctuations in the output of the laser diode. Thus, the laser diode acts as a high gain amplifier of the acoustic signal from the fiber coil. Similar results can be obtained with light sources such as a gas laser or light-emitting diode, although the gain of light-emitting diodes is not as large. A portion of the output of the light source is split by another beamsplitter onto a detector whose electrical output becomes the output of the sensor for display or use.

In more complex embodiments, extra beamsplitters and mirrors can be used to redirect the frequency-modulated light back to the light source more intensely for higher gain. This also can be accomplished by inserting a phase shifter in the light beam that adjusts the relative phase of the counter propagating beams upon emergence from the fiber coil so that the maximum amount of modulated light is directed toward the light source. Hybrid units can be constructed using fiber optic beamsplitters rather than the more conventional type to assure that more light is fed back to the light source. A feedback loop, including a notch or bandstop filter, a signal inverter, and a phase shifter, also can be applied between the detector output and the modulated light beam to filter out noise from the desired signal frequencies. More elaborate versions of this system can be used to suppress all but a specific frequency. It also is possible to use the sensors in an array to obtain more sensitivity or directional information. An alternative embodiment operates the light source at high power levels well above threshold and uses a beamsplitter to direct the return beam from the fiber coil onto the detector. The techniques described above for enhancing the intensity of the return light beam and for noise suppression also apply.

It is therefore an object of the present invention to provide an optical acoustic sensor which can be used as a replacement for microphones on a one-to-one basis.

Another object is to provide an acoustic sensor with high sensitivity, immunity to electromagnetic interference, and the ability to operate under extreme environmental conditions.

Another object is to provide an acoustic sensor which has low power consumption.

Another object is to provide an optical acoustic sensor which can be incorporated conveniently into large arrays.

Another object is to provide an acoustic sensor into which noise suppression can be incorporated easily.

These and other objects and advantages of the present invention will become apparent to those skilled in the art after considering the following detail specification in conjunction with the accompanying drawings wherein:

BRIEF DESCRIPTION OF THE DRAWINGS

FIG. 3 is a diagrammatic view of another modification of FIG. 1 employing a phase shifter to optimize feedback into the light source;

FIG. 4 is a diagrammatic view of a modified embodiment of FIG. 1 employing fiber optic beamsplitters;

FIG. 4A is a diagrammatic view of a Y type fiber optic beamsplitter;

DETAILED DESCRIPTION OF THE SHOWN EMBODIMENTS

Figure 1:
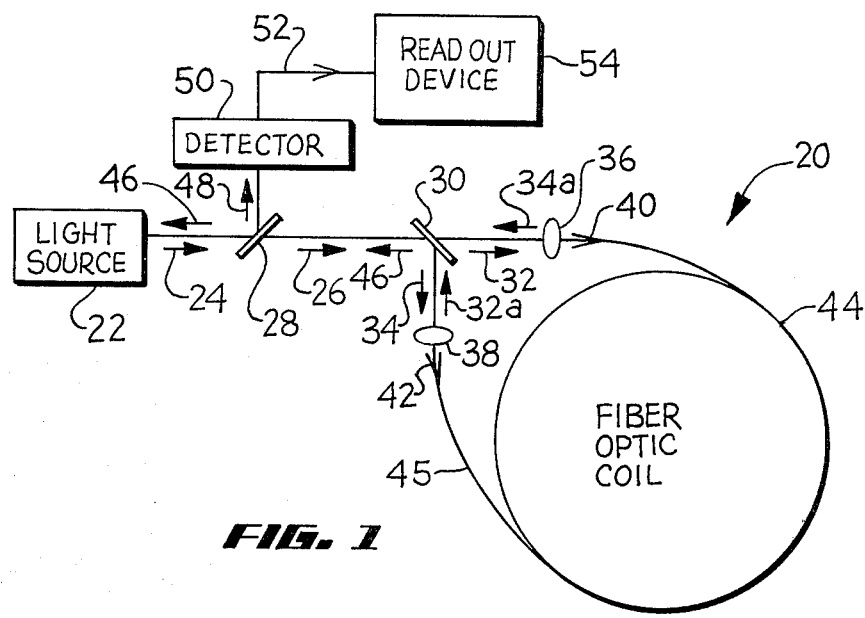
FIG. 1 is a diagrammatic view of a basic optical acoustic sensor constructed according to the present invention.

Referring to the drawings, more particularly the reference numbers, number 20 in FIG. 1 refers to an acoustic sensor constructed according to the present invention. This sensor 20 includes a light source 22 such as a laser, a laser diode, or a light-emitting diode, which emits a beam of light 24, a portion of which 26 passes through a detector beamsplitter 28 and is split by a second beamsplitter 30 into a clockwise beam 32 and a counter-clockwise beam 34. The beams 32 and 34 are focused by means of suitable lenses 36 and 38 respectively into the opposite ends 40 and 42 of a fiber optic coil 44. Even if the light is not what is generally known as coherent, the ends 40 and 42 can act as spatial filters to produce a coherent characteristic in the beams 32 and 34.

The coil 44 normally is a multi-turn coil. The choice of number of turns depends upon the sensitivity required (more turns, more sensitivity) and the amount of light attenuation that can be accommodated by the length of the optical fiber 45 (more length, more attenuation). The clockwise light beam 32 enters the end 40 of the coil 44 and exits the coil at its end 42 as beam 32$a$ while the beam 34 enters the coil 44 at its end 42 and exits the coil 44 at its end 40 as beam 34$a$. The beamsplitter 30 then recombines the beams 32$a$ and 34$a$ into a return beam 46. If the fiber optic coil 44 is subjected to acoustic noise, the coil 44 causes nonreciprocal phase differences between the light beams 32$a$ and 34$a$ which are superimposed on the return beam 46 to modulate it. The beam 46 passes through the beamsplitter 28 and is redirected into the light source 22, the beam 46 being modulated at the acoustic frequency seen by the fiber coil 44.

It is preferable that the light source 22 be a laser diode operating near its threshold. When this is true, small amounts of feedback due to the back-scattered light in the beam 46 cause large fluctuations in the output thereof so that the light source 22 acts as a high gain amplifier of the acoustic signal from the fiber coil 44. Similar results can be obtained when the light source 22 is a gas laser or light-emitting diode operated under the same conditions, although in the case of a light-emitting diode, the gain that can be expected is not large.

The light output beam 24 of the light source 22 is split by the beamsplitter 28 as aforesaid so that a portion 48 of the beam 24 is applied to a suitable detector 50, which, in response thereto, produces an electrical signal 52 for transmission to an oscilloscope or other readout device 54.

Figures 1A, 1B:
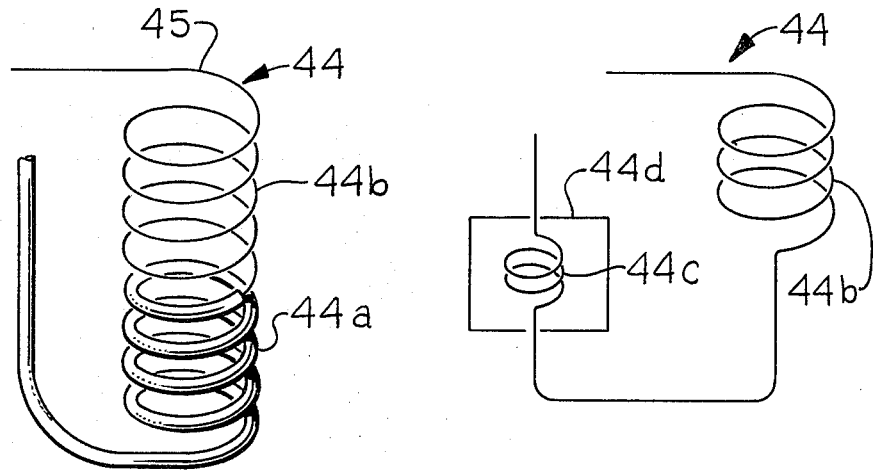
FIG. 1A is a diagrammatic view of means to optimize the acoustic sensitivity of a fiber optic coil used in the sensor of FIG. 1 by acoustically isolating one half of the coil.
FIG. 1B is a diagrammatic view of other means to optimize the sensitivity of the fiber optic coil by removing one half of the coil from the sound field.

In order to optimize the sensitivity of the optical acoustic sensor 20, it is necessary to isolate one half 44$a$ of the fiber coil 44 from acoustic signals and sensitize the other half 44$b$. This may be accomplished by jacketing one half 44$a$ of the fiber 45 starting at one end, as in FIG. 1A, or moving one half 44$c$ of the fiber coil 44 out of the sound field, such as by placing it in an acoustic isolation chamber 44$d$ as shown in FIG. 1B.

Figure 1C:
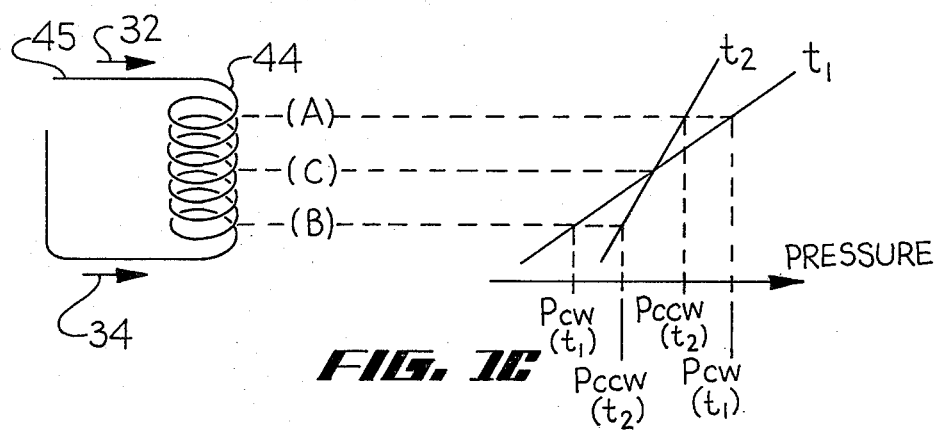
FIG. 1C is a diagrammatic view showing the effect of an acoustic wave on a fiber optic coil.
Figures 1D, 1E:
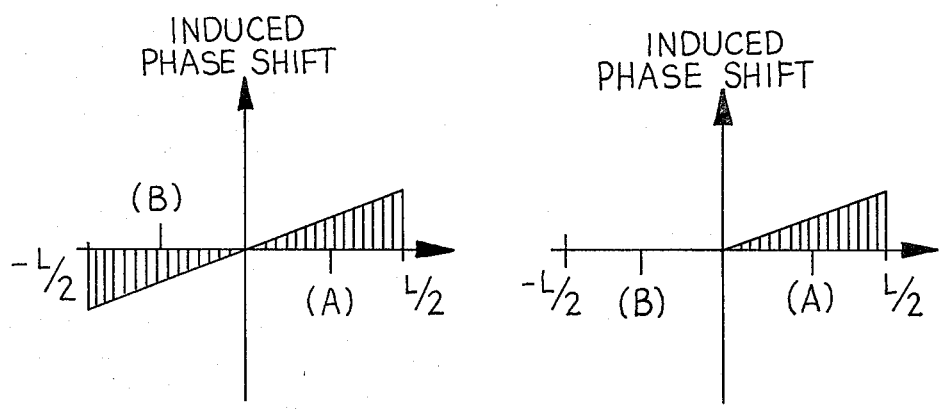
FIG. 1D illustrates graphically the effect of acoustic energy on an unshielded fiber optic coil.
FIG. 1E illustrates graphically the effect of shielding a portion of the fiber optic coil.

To understand why this procedure enhances sensitivity, consider for example, that the speed of sound in water is 1500 m/sec, and thus at 1.5 KHZ the wave is one meter in length. Even at 15 KHZ, which is beginning to approach the upper range of the acoustic frequencies normally of interest, the wavelength of the sound is 10 cm, which is long compared to the fiber coil height that usually ranges from 0.1 mm to 1 cm. Thus the wave can be thought of as an instantanious linear pressure gradient across the fiber coil 44 as shown in FIG. 1C for times $t_1$, and $t_2$. The pressure difference seen by the point (A) of the coil between the cw and ccw light beams 32 and 34 is given by $P_A = P_{cw}(t_1) - P_{ccw}(t_2)$ where the cw beam 32 arrives at $t_1$ and the ccw beam 34 at $t_2$. Now on the other half of the coil 44 there is a corresponding point (B) such that the ccw beam 34 arrives at $t_1$, and the cw beam 32 at $t_2$, and $P_B = P_{ccw}(t_1) - P_{cw}(t_2)$. The center point (C) remains stationary because it takes the beams 32 and 34 the same time to reach (C) no matter what the applied pressure. In the absence of acoustic shielding for this situation, $P_A + P_B = 0$, and there is no net phase difference between the two beams. FIGS. 1D and 1E plot the relative phase shift induced by a pressure gradient across a coil of length L with and without acoustic insulation over one half the coil, the center of the coil 44 being considered position zero. From FIG. 1E it is apparent that the largest net phase shift between the cw and ccw beams 32 and 34 occurs when one half of the coil is shielded starting at one end, i.e., $P_B = 0$ so that $P_A + P_B = P_A$.

Figure 2:
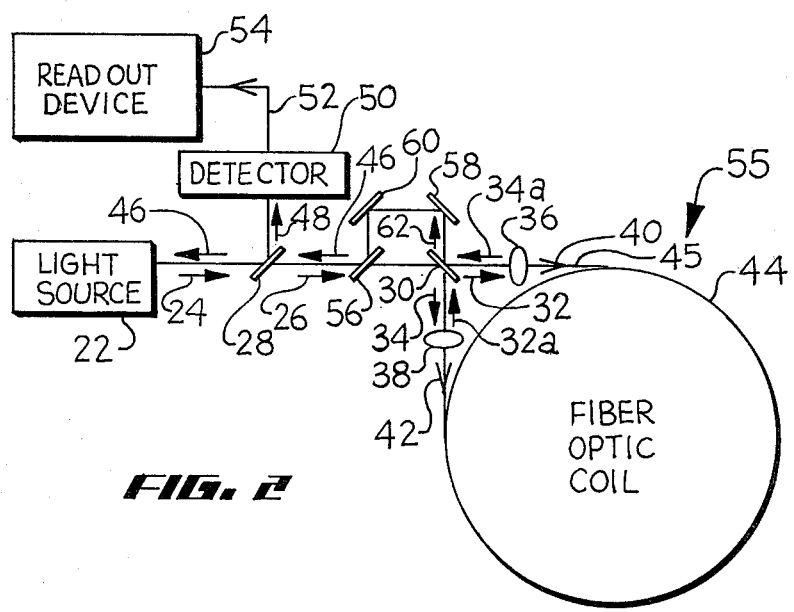
FIG. 2 is a diagrammatic view of the acoustic sensor of FIG. 1 including means for optimizing performance by increasing the light fed back to the light source.
Figure 3A:
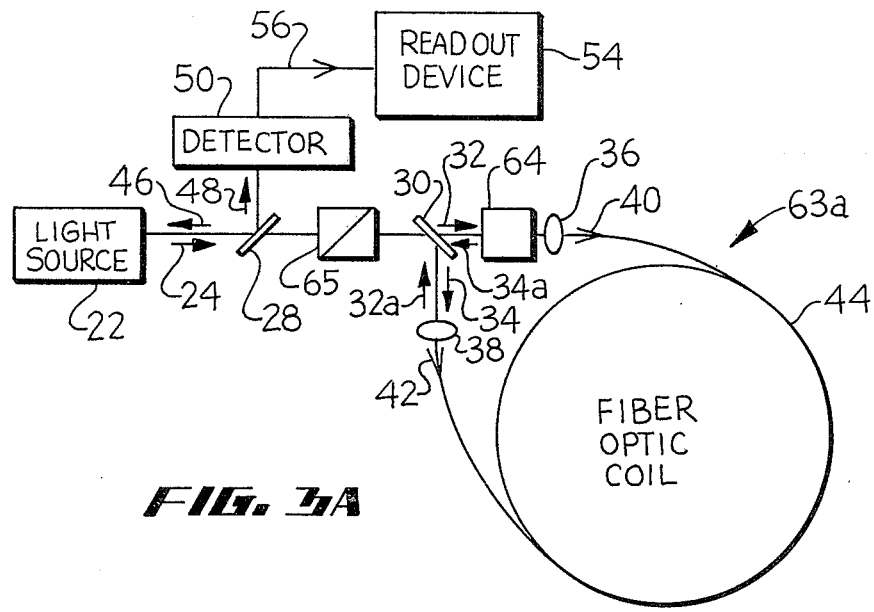
FIG. 3A is a diagrammatic view of a modification of FIG. 1 that employs a polarizing element to enhance sensitivity.

The embodiment as shown in FIG. 1 does not couple all the light circulating through the fiber coil 44 back to the light source 22, whereas FIGS. 2, 3, and 4 show modified devices for optimizing the light feedback.

In the sensor 55, shown in FIG. 2, a third beamsplitter 56 and two mirrors 58 and 60 are added to redirect light 62 from the beamsplitter 30 that would otherwise not reach the light source 22. This is accomplished by providing the mirrors 58 and 60 in positions to reflect the light 62 back to the beamsplitter 56 wherein the light 62 is combined into the beam 46.

In FIG. 3, the sensor 63 includes a phase shifter 64 positioned between the second beamsplitter 30 and the lens 36. The phase shifter 64 adjusts the relative phase of the counterpropagating beams 32 and 34 upon emergence from the fiber coil 44 so that the maximum amount of modulated light power is directed toward the light source 22.

Figure 3B:
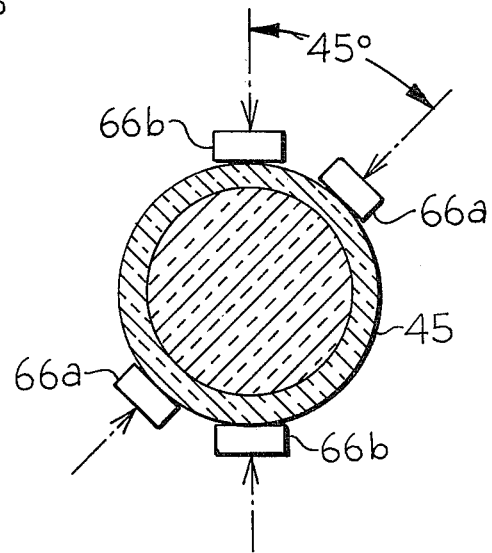
FIG. 3B is a diagrammatic view of an intensity maintenance device placed at one end of the fiber optic coil to ensure maximum acoustic signal.

The exact nature of the phase shifter 64 depends upon the type of single-mode optical fiber 45 employed. If the fiber 45 is polarization preserving, a single drop off due to changing birefringence of the fiber 45 is not a serious problem, and a simple phase shifter 64 is adequate. However, conventional single-mode fiber is subject to birefringence noise, that is, the relative state of polarization of the beams 34a and 32b may be altered due to temperature and pressure effects on the fiber coil 44. This phenomenon in itself may be used to enhance the magnitude of the returning acoustic signal impressed on the light beam. That is, since the relative polarization state of the two beams changes at a rate proportional to the acoustic frequency of the impinging pressure wave, the depth of modulation can be enhanced by defining a particular state of polarization by inserting a polarizing element 65 in the beam path, as shown with sensor 63a of FIG. 3A. In particular, the light beam 34 enters the fiber coil 44 in a polarization state defined by the polarizing element 65. The action of an acoustic wave impinging on the fiber optic coil 44 is to rotate the state of polarization of the circulating beam 34 so that when it leaves the coil 44 as beam 34a, it does not have the same polarization state as beam 34. Consequently, when beam 34a passes back through the polarizing element 65, it is attenuated by an amount dependent upon the degree of polarization state rotation between beams 34 and 34a, which in turn is proportional to the acoustic frequency. The degree of polarization rotation can be controlled by using a sequence of elements that exert force on the fiber, changing the birefringence locally and causing the state of polarization to rotate to the desired position. Such a system is shown in FIG. 3B where two pairs of elements 66a and 66b exerting compressive force on the fiber 45 are aligned at 45° with respect to each other. In this manner two adjustable fiber optic "waveplates" are established whose retardance can be controlled by adjusting the degree of compression. In particular the compression can be adjusted to move an incoming state of polarization toward the desired outgoing polarization state.

Figure 4B:
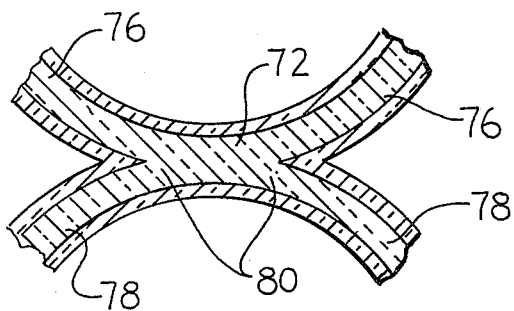
FIG. 4B is a diagrammatic view of an X type fiber optic beamsplitter.

In FIG. 4, a further modified version 67 is employed in which the beamsplitters 28 and 30 of FIG. 3 as well as the lenses 36 and 38 are eliminated by providing fiber optic beamsplitters 68 and 70 as substitutes for the beamsplitters 28 and 30 respectively. The construction of such beamsplitters 68 or 70 is shown in FIGS. 4A and 4B wherein the fiber 72 with its cladding 74 is bifurcated into a fused Y or X so that the fiber 72 continues as two fibers 76 and 78. Light passing from fiber 72 past the juncture 80 of the fibers 76 and 78 is split so that about half goes through fiber 76 and the rest goes through fiber 78. When operating in the other direction, light from fibers 76 and 78 combine at the juncture 80 to pass in the opposite direction on fiber 72. Although such fiber optic beamsplitters are difficult to construct, they ensure a minimum of light loss due to splitting and recombination of the light beams. Otherwise, the sensor 67 operates identically to the sensor 63.

Figure 5:
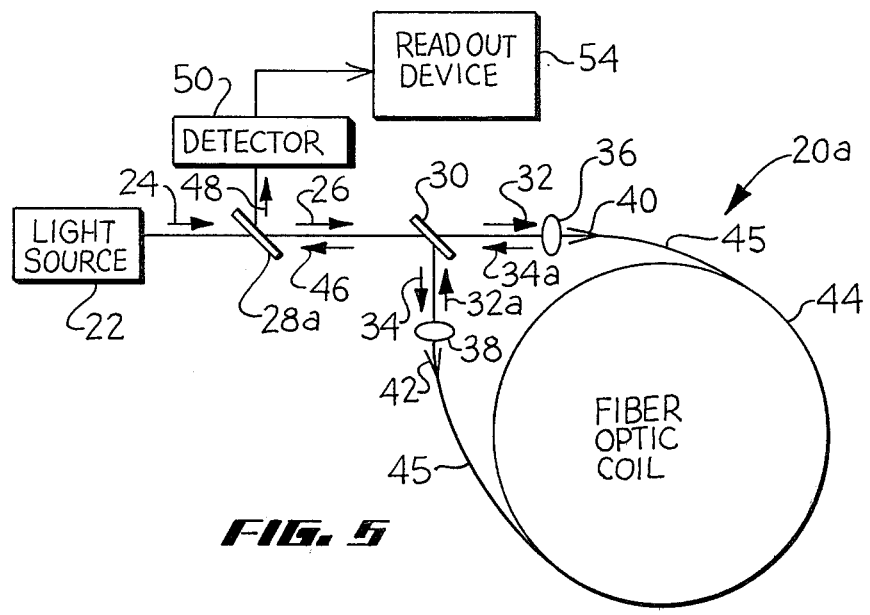
FIG. 5 is a diagrammatic view of a modification of FIG. 1 where the output beamsplitter has been reoriented.
Figure 6:
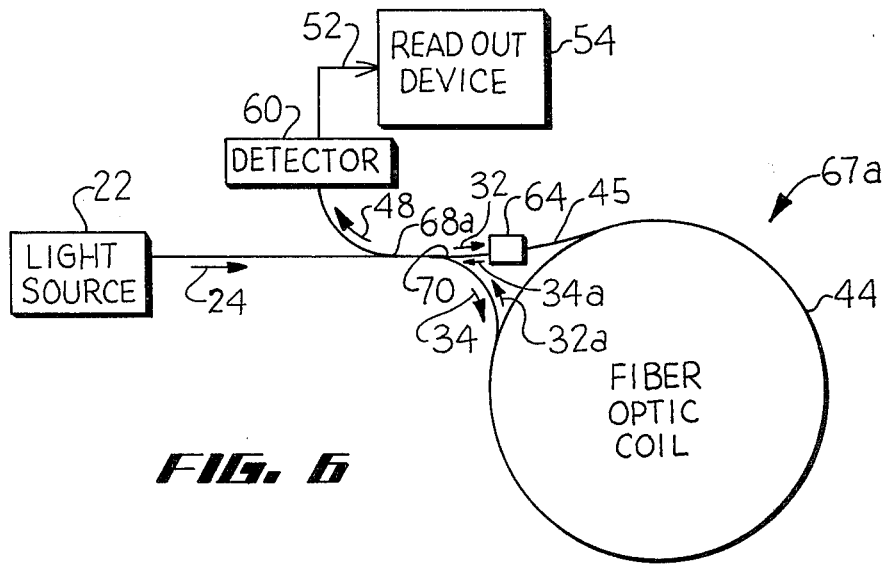
FIG. 6 is a diagrammatic view of a modification of FIG. 4 where the output fiber optic beamsplitter has been reoriented.

The orientation of the beamsplitter 28 or 68 of FIGS. 1 through 4 may be changed as in the beamsplitters 28a and 68a of FIGS. 5 and 6 respectively. These configurations are useful as the light source 22 is isolated from back reflections by an element that may be a Faraday rotator. For these cases, the light source 22, which may be a laser or laser diode, can operate well above threshold, increasing the amount of light introduced into the system 20a or 67a and the intensity of the return signal 48, although the light source 22 would not act as a gain element. Therefore, it should be understood that the beamsplitters 28 and 68 or 28a or 68a may be oriented to receive an output signal from the light source 22 as in FIGS. 1 through 4, or from the fiber coil 44 as in FIGS. 5 and 6 and in each of the embodiments and arrays described below.

Figure 7:
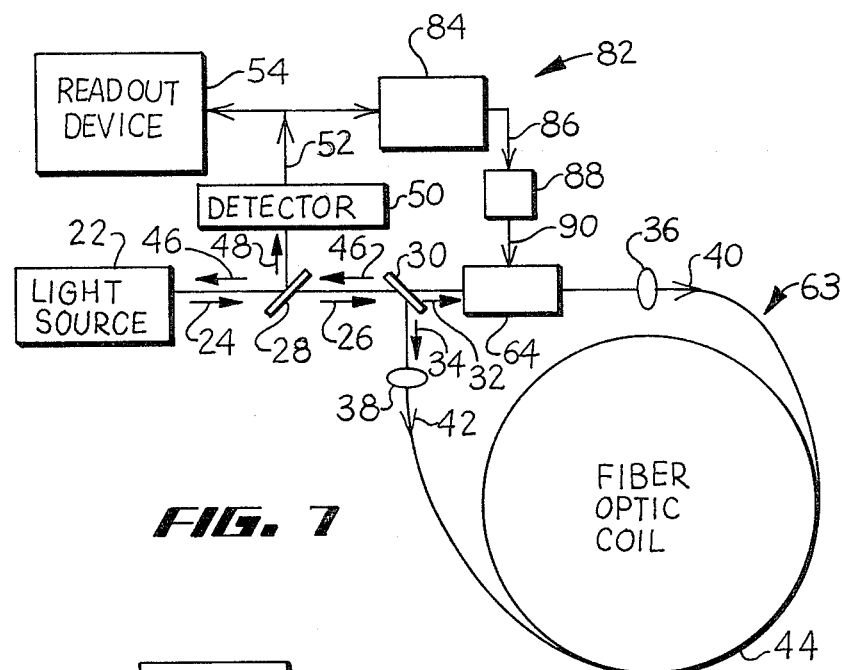
FIG. 7 is a diagrammatic representation of a modified embodiment of FIG. 1 including a noise suppression system employing a notch filter.

In FIG. 7 a noise suppression system 82 has been added to the sensor 63 of FIG. 3, although the sensor 67 of FIG. 4, 20a of FIG. 5, or 67a of FIG. 6, could just as well be shown. The noise suppression system 82 includes a notch or bandstop filter 84 to which is fed the output 52 of the detector 50. The notch or bandstop filter 84 is constructed to block out the desired signal frequencies while letting noise pass from its output 86 to a signal inverter 88 where the noise signal is inverted and fed via the output 90 of the signal inverter 88 to the phase shifter 64. Since the noise is inverted in the signal inverter 88, the noise is nulled out in the phase shifter 64.

Figure 8:
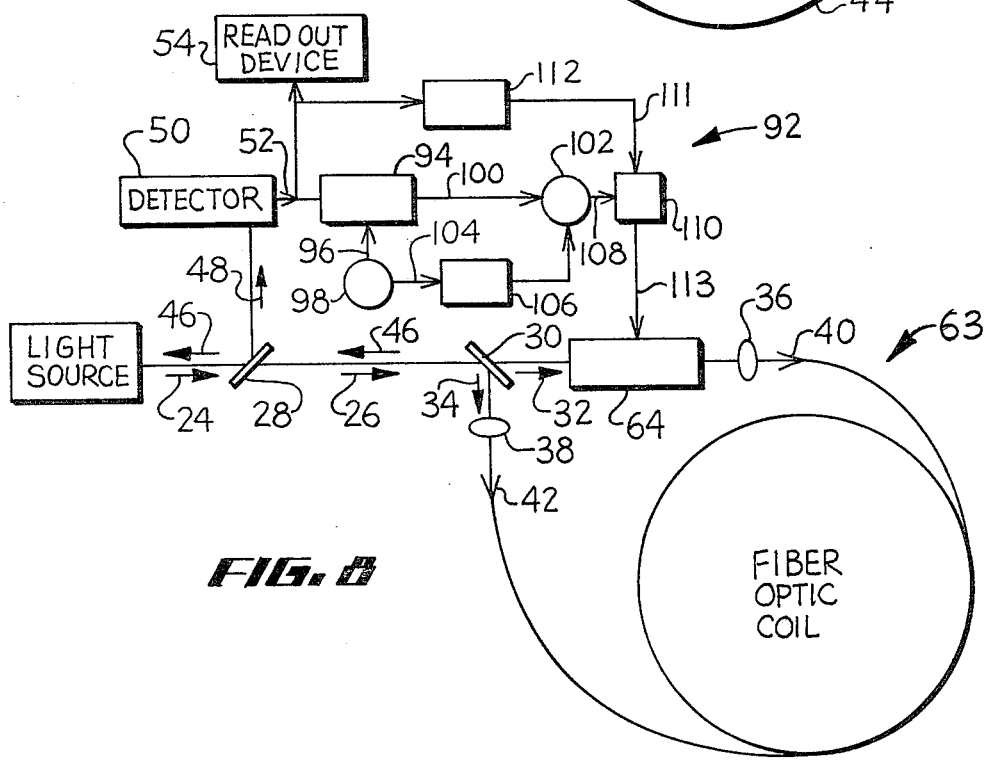
FIG. 8 is a diagrammatic view of a modified version of FIG. 1 designed to detect a signal of a specific frequency.

A somewhat more complex noise suppression system 92 is shown in FIG. 8 in association with sensor 63. The noise suppression system 92 is particularly useful when it is desired to look for a particular acoustic frequency and detect the amplitude of that signal. For that reason, the output 52 from the detector 50, in addition to being fed to the output device 54, is also fed to a correlator 94 which is used to maximize signal strength at the desired acoustic frequency by delay. The correlator 94 also is connected to one output 96 of an acoustic frequency generator 98 which is chosen to generate the acoustic frequency or frequencies, if more than one frequency is to be sampled, which is to be detected. The signal on the output 96 from the generator 98 is compared to the output signal 52 of the detector 50 in the correlator 94 which produces an output signal on line 100. This compared output signal is fed to a mixer 102. The mixer 102 also receives the signal from the second output 104 of the generator 98 after it has passed through a delay line 106 so that the original signal level of the desired frequency is restored at the output 108 of the mixer 102 for feeding to a signal inverter 110. The delay line 106 is used to compensate for delays caused within the correlator 94 so that phasing problems are not present at the mixer 102. The output of the detector 50 also is passed through a second delay line 112 similar to delay line 106 and from there to the signal inverter 110 where the signal 52 as delayed by the delay line 112 and as processed through the correlator 94 and mixer 102 is subtracted from the signal on the output 111 of the delay line 112. This causes the signal on the output 113 of the signal inverter 110 to be the same as the output of the detector 50 except for the frequency of interest. Therefore, when the output signal of the signal inverter 110 is applied to the phase shifter 64, the phase shifter 64 nulls out all but the desired frequency by the nulling action of the system 92 operating closed loop.

Figure 9:
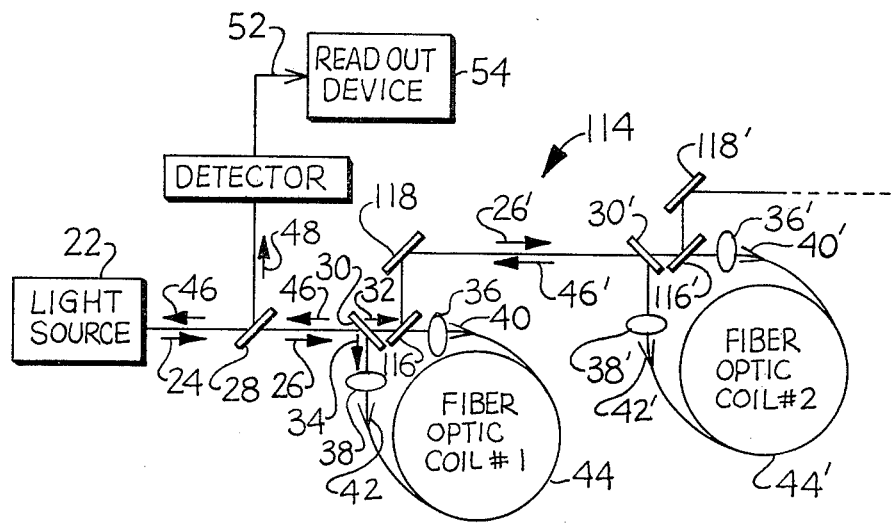
FIG. 9 is a diagrammatic view of modified devices of FIG. 1 arranged in an array.
Figure 10:
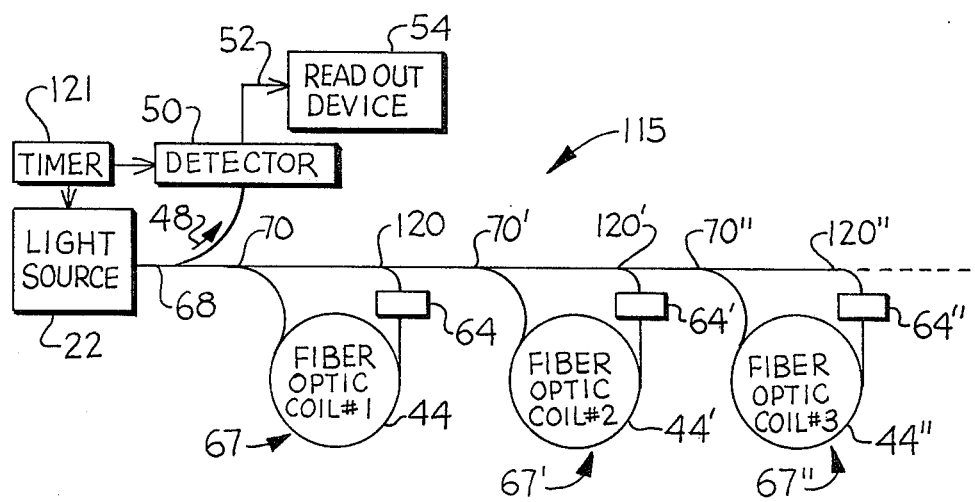
FIG. 10 is a diagrammatic view of an array of optical acoustical sensors similar to those of FIG. 4 arranged in an array.

It is also possible to extend the sensors 20, 55, 63, with or without noise suppression systems such as systems 82 and 92 into array systems 114 as shown in FIG. 9, or 115 as shown in FIG. 10. In FIG. 9, a second fiber coil 44', having identical components as the first fiber coil 44 numbered with a prime (') is shown as representative of the array. The array system 114 has in addition third beamsplitters 116 and 116' positioned between the second beamsplitter 30 or 30' and the lens 36 or 36'. The beamsplitter 116 feeds a portion of the light present in beam 32 via a mirror 118 as the input beam 26' to the beamsplitter 30' of the coil 44'. The coil 44' operates on the beam 26', as does the coil 44 on beam 26, to generate a return beam 46' modulated in accordance with acoustic energy being applied to the beam coil 44'. As can be seen, this can be continued through the use of beamsplitter 116' and mirror 118' so that the serial array system 114 is created. A similar serial array also can be created using multiple sensors 67 as shown in FIG. 10 wherein multiple coils 44, 44', and 44" are connected via fiber optic beamsplitters 70, 70', 70" and so on, are positioned in serial fashion with the beamsplitters 120, 120', and 120" corresponding to beamsplitters 116, 116' and mirrors 118 and 118' shown in FIG. 9. The systems of FIGS. 9 and 10 can be operated in a number of ways, perhaps the simplest involving pulsing the light source 22, which may be a laser diode operating near threshold. The pulses are applied periodically at high power levels. The detector 50 is electronically gated by the timer 121 so that it receives acoustic signals from each sensor coil, 44, 44', 44" and so on in turn for processing.

Figure 11:
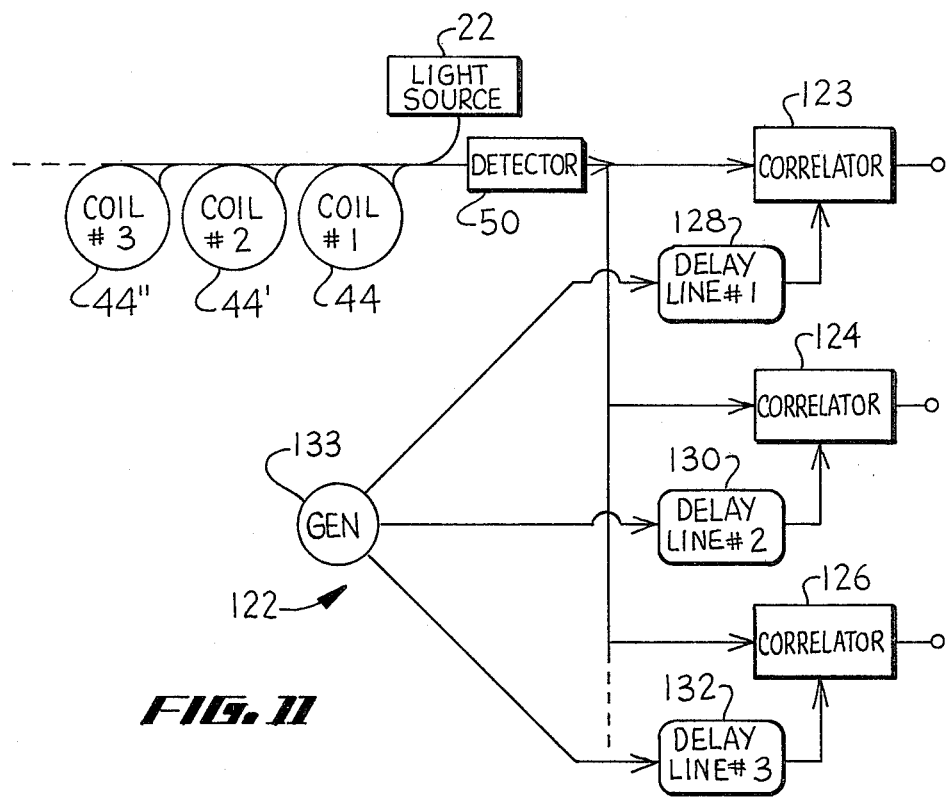
FIG. 11 is a diagrammatic view of a continuous output scheme for an array of optical acoustic sensors employing correlators and delay lines.
Figure 12:
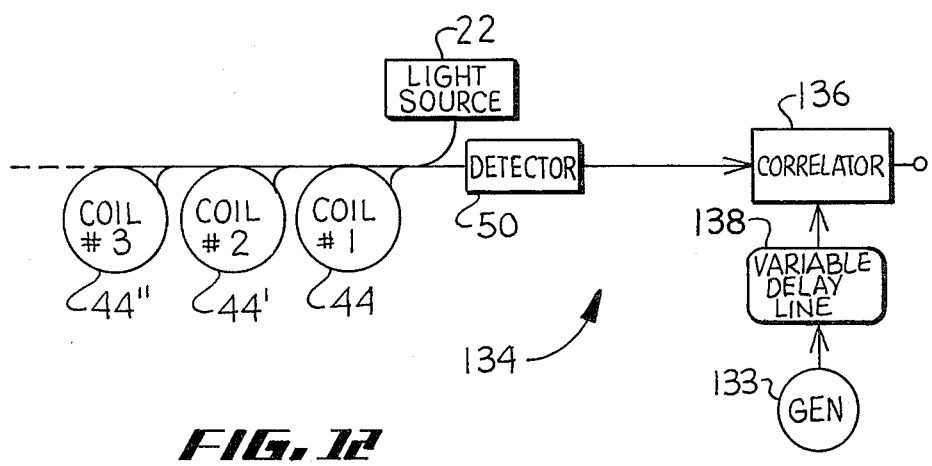
FIG. 12 is a diagrammatic view of a sequential output scheme for optical acoustic sensor arrays constructed according to the present invention.

Another array system 122 is shown in FIG. 11 where the arrays of FIG. 9 or 10 can be used and the light source 22 is operated continuously. The output from the fiber coils 44, 44', and 44" is fed to correlators 123, 124, and 126. Delay lines 128, 130, and 132 are placed between the correlators 123, 124 and 126 and a reference generator 133 to maximize the signal from each fiber optic coil and so that each acoustic sensor coil output may be monitored continuously. A variation 134 is shown in FIG. 12 where an auto correlator consisting of a correlator 136 and a variable delay line 138 is used instead of the correlators 123, 124, or 126 and their associated delay lines 128, 130, and 132. The arrangement 134 shown in FIG. 12 allows each acoustic sensor coil 44, 44' and 44" to be sampled in sequence.

Figure 13:
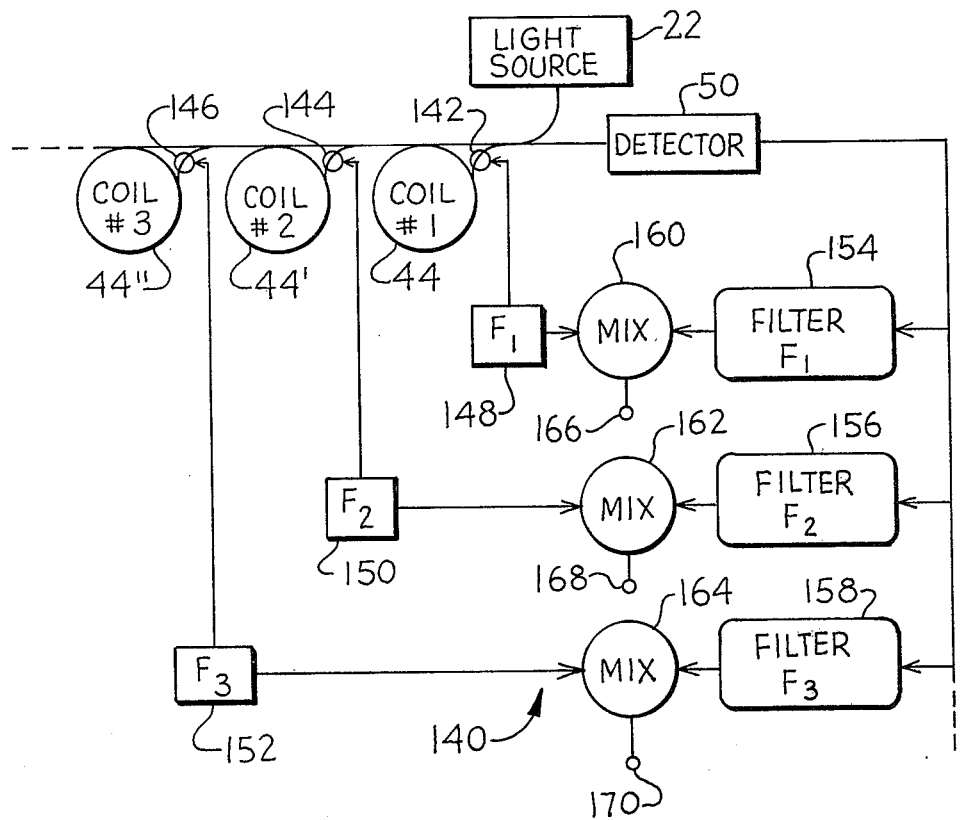
FIG. 13 is a diagrammatic view of a continuous output scheme for an array of optical acoustic sensors using frequency modulated fiber optic coils.

A third array scheme 140 is shown in FIG. 13. Compression, strain, or bending phase shifter elements 142, 144 and 146 are driven by drivers 148, 150 and 152 so they each exert a force on a portion of each fiber optic coil 44, 44', 44" at frequencies $F_i$, i=1, 2, 3, ... where the $F_i$ are chosen so that they do not have related harmonics. In essence this imposes a different carrier frequency on the output of each coil 44, 44', 44". The acoustic output of each fiber coil 44, 44' and 44" is monitored continuously through the use of bandpass filters 154, 156 and 158 tuned to be selective to the carrier frequency of the associated coil. After passing through the correct bandpass filter, the signal is sent to an associated mixer 160, 162 or 164 which mix the outputs of the associated driver and filter to restore the original acoustic signal on outputs 166, 168 and 170.

Therefore, there has been shown and described novel acoustic sensors which fulfill all the objects and advantages sought therefore. Many changes, modifications, variations, other uses and applications of the subject invention will, however, become apparent with those familiar in the art after considering the foregoing specification together with the accompanying drawings. All such changes, modifications, variations, and other uses and applications which do not depart from the spirit and scope of the invention are deemed to be covered by the invention, which is limited only by the claims which follow.

What is claimed is:

1. A sensor for acoustic energy which includes:
   a light source which produces a light output;
   a first beamsplitter positioned to split said light output of said light source into first and second beams;
   fiber optic coil means having first and second opposite ends into which said first and second beams respectively are introduced, at least a portion of said fiber optic coil means being subjected to acoustic energy which nonreciprocally phase shifts said first and second beams, said first beamsplitter being positioned to recombine said first and second beams out of said second and first ends respectively into a third beam which is modulated by said acoustic energy; and
   means to detect modulation present in said third beam and produce therefrom an output representative of said acoustic energy.

2. The sensor for acoustic energy as defined in claim 1 wherein said means to detect modulation present in said third beam includes:
   a light detector and said sensor further includes:
   a second beamsplitter positioned in said light output of said light source and in said third beam to direct at least a portion of said third beam to said light detector.

3. The sensor for acoustic energy as defined in claim 2 wherein said light source is a component sensitive to light feedback which responds to variations in light feedback by varying its output, said second beamsplitter being constructed and positioned to allow a portion of said third beam to feedback to said light source to cause modulation of said light source so that said light source acts as a gain element in said sensor.

4. The sensor for acoustic energy as defined in claim 3 wherein said light source is a laser diode.

5. The sensor for acoustic energy as defined in claim 3 wherein said light source is a gas laser.

6. The sensor for acoustic energy as defined in claim 3 wherein said light source is a light-emitting diode.

7. The sensor for acoustic energy as defined in claim 3 further including:
   a third beamsplitter positioned between said first and second beamsplitters; and
   first mirror means positioned in alignment with said first beamsplitter to reflect a portion of said third beam which is not directed toward said second beamsplitter toward said third beamsplitter where said portion of said third beam is directed toward said second beamsplitter.

8. The sensor for acoustic energy as defined in claim 1 wherein said fiber optic coil means are a fiber optic coil including:
   a first portion subjected to acoustic energy; and
   a second portion shielded from acoustic energy.

9. The sensor for acoustic energy as defined in claim 8 wherein said fiber optic coil first and second portions are each about one half of said fiber optic coil.

10. The sensor for acoustic energy as defined in claim 2 further including:
    a phase shifter positioned between first beamsplitter and one of said ends of said fiber optic coil means to phase shift the beams of light passing between said first beamsplitter and the one of said coil ends to optimize the amount of light in said third beam.

11. The sensor for acoustic energy as defined in claim 2 further including:

at least one phase shifter positioned on said fiber optic coil means adjacent one of said ends thereof to phase shift the beams of light passing between said first beamsplitter and the one of said coil ends to optimize the amount of light in said third beam.

12. The sensor for acoustic energy as defined in claim 11 wherein said at least one phase shifter is an electrically controllable phase shifter and wherein said output of said means to detect modulation present in said third beam detector is an electrical output, said sensor further including a noise suppression system having:
 a notch filter connected to said electrical output of said detector means which passes therethrough as an output, signals other than those in a frequency band of interest; and
 means to invert said output of said notch filter, said inverted signal of said notch filter being applied as an electric control input to said phase shifter to null out frequencies of the acoustic energy not of interest.

13. The sensor for acoustic energy as defined in claim 11 wherein said phase shifter is an electrically controllable phase shifter and output of said means to detect any modulation present in said third beam is an electrical output, said sensor further including a noise suppression system having:
 acoustic generator means having outputs and being capable of producing at its outputs at least one acoustic frequency of interest to be detected by said sensor;
 correlator means connected to receive said electrical output of said detector means and one of said outputs of said acoustic generator to produce therefrom a correlator output;
 first delay means connected to an output of said acoustic generator means and producing therefrom a first delayed acoustic signal;
 mixer means to which are fed said correlator output and said first delayed acoustic signal, said mixer means mixing said correlator output and said first delayed acoustic signal and producing therefrom a first mixed signal;
 second delay means connected to said output of said detector means and producing therefrom a second delayed acoustic signal; and
 signal inverter means connected to subtract the first mixed signal from the second delayed acoustic signal and producing therefrom an inverted output signal to said phase shifter to null other than the desired frequencies.

14. The sensor for acoustic energy as defined in claim 2 further including:
 a polarizing element positioned between said first and second beamsplitters to define a particular state of polarization of said beam passing from said light source to said first beamsplitter, said acoustic energy rotating the polarization of said beams in said fiber optic coil means so that when passing back through said polarizing element said beam is attenuated by an amount proportional to said acoustic energy.

15. The sensor for acoustic energy as defined in claim 14 wherein said fiber optic coil means include an optical fiber, said sensor further including:
 a first pair of pressure elements which apply a first force in a first predetermined direction across said optical fiber of said fiber optic coil means; and
 a second pair of pressure elements which apply a second force in a second predetermined direction across said optical fiber of said fiber optic coil means which second predetermined direction is about 45° to said first predetermined direction, said first and second pairs of pressure elements being capable of moving an incoming state of polarization toward a desired outgoing polarization state through variance of said first and second forces.

16. The sensor for acoustic energy as defined in claim 1 wherein said means to detect any modulation present in said third beam includes a light detector and said sensor further includes:
 a second beamsplitter positioned in said light output of said light source and in said third beam to direct a substantial portion of said third beam to said light detector.

17. The sensor for acoustic energy as defined in claim 2 further including:
 a third beamsplitter positioned in at least a portion of said light output of said light source to project a portion thereof as a fourth beam; and
 a fourth beamsplitter positioned to split said fourth beam into fifth and sixth beams, said fiber optic coil means including:
 first and second fiber optic coils each having first and second ends, said first and second ends of said second fiber optic coil having introduced thereinto said fifth and sixth beams respectively, at least a portion of said second fiber optic coil being subjected to acoustic energy which nonreciprocally phase shifts said fifth and sixth beams, said fourth beamsplitter being positioned to recombine said fifth and sixth beams into a seventh beam which is modulated by said acoustic energy, and to project said seventh beam back to said third beamsplitter, to said second beamsplitter, and hence to said light detector.

18. The sensor for acoustic energy as defined in claim 17 wherein said third beamsplitter is positioned between said first beamsplitter and said first end of said first fiber optic coil.

19. The sensor for acoustic energy as defined in claim 17 wherein said first and second fiber optic coils each include;
 a first portion of a predetermined length subjected to acoustic energy; and
 a second portion of a similar predetermined length shielded from acoustic energy.

20. The sensor for acoustic energy as defined in claim 1 wherein said first beamsplitter is a plurality of first arrayed beamsplitters and said fiber optic coil means is a plurality of arrayed fiber optic coils each associated with a corresponding first arrayed beamsplitter, said sensor further including:
 means to distribute said light output of said light source to said first arrayed beamsplitters and to combine said third beams modulated by acoustic energy into a combined third beam for modulation detection by said means to detect modulation present in said third beam.

21. The sensor for acoustic energy as defined in claim 20 further including:
 a plurality of phase shifters, each positioned adjacent one of said ends of an associated fiber optic coil to phase shift the beams of light passing between said associated first arrayed beamsplitter and the one of said associated arrayed fiber optic coil ends to optimize the amount of light in said third beam being produced thereby.

22. The sensor for acoustic energy as defined in claim 21 wherein each of said fiber optic coils of said plurality of arrayed fiber optic coils includes:
a first portion of a predetermined length subjected to acoustic energy; and
a second portion of a similar predetermined length shielded from acoustic energy.

23. The sensor for acoustic energy as defined in claim 22 wherein said first arrayed beamsplitters and arrayed fiber optic coils are arranged in a serial array.

24. The sensor for acoustic energy as defined in claim 22 wherein said means to distribute said light output of said light source to said first arrayed beamsplitters and to combine said third beams modulated by acoustic energy into a combined third beam for modulation detection by said means to detect modulation present in said third beam include a plurality of second beamsplitters one less in number than the number of first arrayed beamsplitters and arrayed fiber optic coils, each of said second beamsplitters being positioned between associated first arrayed beamsplitters and arrayed fiber optic coil ends to couple said third beams together.

25. The sensor for acoustic energy as defined in claim 24 wherein said second beamsplitters are fiber optic beamsplitters.

26. The sensor for acoustic energy as defined in claim 20 wherein said means to detect modulation present in said third beam include:
a detector positioned to receive said combined third beam and to produce therefrom an output signal representative of modulation thereof;
a plurality of signal correlators, each having an input connected to receive said output signal of said detector;
signal generator means having a plurality of outputs of at least one frequency of interest, an output thereof being connected to each of said correlators as a second input thereto, whereby said correlators produce therefrom an output corresponding to the modulation of said combined third beam at said at least one frequency of interest.

27. The sensor for acoustic energy as defined in claim 26 wherein said signal generator means include:
a plurality of delay lines which delay said output signals of said generator means in correspondence with the distance between said arrayed fiber optic coils whereby directional information can be derived from said outputs of said correlators.

28. The sensor for acoustic energy as defined in claim 20 wherein said means to detect modulation present in said combined third beam include:
a detector positioned to receive said combined third beam and to produce therefrom an output signal representative of modulation thereof;
signal correlator means having a first input connected to said output signal of said detector; and
signal generator means having an output of at least one frequency of interest connected to said correlator as a second input thereto, whereby said signal correlator means produce therefrom an output corresponding to the modulation of said combined third beam at said at least one frequency of interest.

29. The sensor for acoustic energy as defined in claim 28 wherein said signal generator means include:
a variable delay line which delays said output signal of said generator means in correspondence with the distance between said arrayed fiber optic coils whereby directional information can be derived from said output of said signal correlator means.

30. The sensor for acoustic energy as defined in claim 20 wherein said means to detect modulation present in said third beam include:
a detector positioned to receive said combined third beam and to produce therefrom an output signal representative of modulation thereof;
a plurality of filters, each having an input connected to receive said output signal of said detector;
signal generator means having a plurality of first and second output pairs, each of said pairs having a different frequency output;
a plurality of mixers each having an input from an associated filter and an input from an associated output pair of said signal generator means; and
a plurality of phase shifters, each being positioned on an associated fiber optic coil adjacent one of said ends thereof to phase shift the beams of light passing between said first beamsplitter thereof and the one of said coil ends, each of said filters being tuned to pass the frequency of the associated one of said output pairs, whereby said output of each said mixers is the signal produced by said associated fiber optic coil.

31. The sensor for acoustic energy as defined in claim 30 wherein said signal generator means include a plurality of discrete frequency generators, each having said first and second output pairs.

* * * * *